(12) United States Patent
Hong

(10) Patent No.: US 11,051,199 B2
(45) Date of Patent: Jun. 29, 2021

(54) CELL MEASUREMENT METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/814,566

(22) Filed: Mar. 10, 2020

(65) Prior Publication Data

US 2020/0213891 A1 Jul. 2, 2020

Related U.S. Application Data

(63) Continuation of application No. PCT/CN2017/101927, filed on Sep. 15, 2017.

(51) Int. Cl.
*H04W 36/00* (2009.01)
*H04W 24/10* (2009.01)
(Continued)

(52) U.S. Cl.
CPC ....... *H04W 24/10* (2013.01); *H04W 36/0058* (2018.08); *H04W 36/0061* (2013.01);
(Continued)

(58) Field of Classification Search
CPC ............. H04W 24/10; H04W 36/0058; H04W 36/0061; H04W 36/0083; H04W 36/08;
(Continued)

(56) References Cited

U.S. PATENT DOCUMENTS

2015/0230157 A1* 8/2015 Rattner ............ H04W 36/0094
455/434
2016/0065342 A1 3/2016 Mirbagheri et al.
(Continued)

FOREIGN PATENT DOCUMENTS

CN 101631346 A 1/2010
CN 103843427 A 6/2014
(Continued)

OTHER PUBLICATIONS

LG Electronics Inc. *"Handover Support for Aerial UE"*, R2-1709463, 3GPP TSG-RAN WG2 #99, Berlin, Germany, Aug. 21-25, 2017, 2 pgs.
(Continued)

*Primary Examiner* — Marcos Batista
(74) *Attorney, Agent, or Firm* — Finnegan, Henderson, Farabow, Garrett & Dunner, L.L.P.

(57) ABSTRACT

A cell measurement method, applied to a base station, includes: configuring, for an unmanned aerial vehicle, a reporting parameter for a measurement report for cell measurement, the reporting parameter for the measurement report at least including a specified measurement cell number and a specified measurement time value; and sending the reporting parameter for the measurement report to the unmanned aerial vehicle, to enable the unmanned aerial vehicle to send the measurement report to the base station when it is detected according to the reporting parameter for the measurement report that a candidate cell queue meets a reporting rule for the measurement report.

18 Claims, 11 Drawing Sheets

One set of specified measured cell number and specified measurement time value corresponding to a present height of a UAV is determined according to multiple sets of specified measured cell numbers and specified measurement time values in a measurement report reporting parameter — 410

When it is detected according to the one set of specified measured cell number and specified measurement time value corresponding to the present height of the UAV that a candidate cell queue meets a measurement report reporting rule, a measurement report is sent to a base station — 420

(51) Int. Cl.
*H04W 36/08* (2009.01)
*H04W 36/30* (2009.01)

(52) U.S. Cl.
CPC ....... *H04W 36/0083* (2013.01); *H04W 36/08* (2013.01); *H04W 36/30* (2013.01)

(58) Field of Classification Search
CPC .. H04W 36/30; H04W 36/0094; H04W 36/32
USPC .......................................... 455/436; 370/338
See application file for complete search history.

(56) References Cited

U.S. PATENT DOCUMENTS

| | | | |
|---|---|---|---|
| 2017/0168480 A1 | 6/2017 | Wänstedt et al. | |
| 2017/0295069 A1* | 10/2017 | Sweet, III | B64C 39/024 |
| 2018/0164805 A1 | 6/2018 | Wänstedt et al. | |
| 2020/0192348 A1* | 6/2020 | Koziol | H04W 16/24 |

FOREIGN PATENT DOCUMENTS

| | | |
|---|---|---|
| CN | 104093176 A | 10/2014 |
| CN | 104662994 A | 5/2015 |
| CN | 105966612 A | 9/2016 |
| CN | 106454970 A | 2/2017 |
| CN | 106604338 A | 4/2017 |
| CN | 106792948 A | 5/2017 |
| CN | 107078819 A | 8/2017 |
| EP | 3137959 A1 | 3/2017 |
| WO | WO 2015/138859 A1 | 9/2015 |
| WO | WO 2016/036840 A1 | 3/2016 |
| WO | WO 2016/12671 A1 | 8/2016 |
| WO | WO 2017/043996 A1 | 3/2017 |

OTHER PUBLICATIONS

International Search Report in the international application No. PCT/CN2017/101927, dated May 29, 2018.
English Translation of the Written Opinion of the International Search Authority in the International Application No. PCT/CN2017/101927, dated May 29, 2018.
Huawei et al., "Measurement Report Mechanism for Drones", 3GPP TSG-RAN WG2 Meeting #99, R2-1708545, Berlin, Germany, Aug. 21-25, 2017.
Extended European Search Report dated Aug. 17, 2020, in counterpart to European Application No. 17925525.0-1212.
Chinese Office Action issued by the State Intellectual Property Office (SIPO) of the People's Republic of China dated Sep. 27, 2020, in counterpart to Chinese Application No. 201780001380.2.

* cited by examiner

CELL MEASUREMENT METHOD AND APPARATUS

CROSS-REFERENCE TO RELATED APPLICATION

This application is a continuation of International Application No. PCT/CN2017/101927 filed on Sep. 15, 2017, the content of which is incorporated herein by reference in its entirety.

TECHNICAL FIELD

The present disclosure generally relates to the technical field of communication, and more particularly, to a cell measurement method and apparatus.

BACKGROUND

An unmanned aerial vehicle (UAV) is generally operated by a radio remote control device and a program control device.

With the continuous development of the UAV technology, UAVs have been widely used. In the related art, for further extending an application range of a UAV, a cellular network is required to provide service meeting a requirement for the UAV. However, a UAV that flies high can detect more neighbor cells, and thus the UAV may need to frequently measure the neighbor cells and report measurement reports, which increases signaling overhead of the UAV.

SUMMARY

According to a first aspect of embodiments of the present disclosure, a cell measurement method, applied to a base station, includes: configuring, for an unmanned aerial vehicle (UAV), a reporting parameter for a measurement report for cell measurement, the reporting parameter for the measurement report at least including a specified measured cell number and a specified measurement time value; and sending the reporting parameter for the measurement report to the UAV, to enable the UAV to send the measurement report to the base station when it is detected according to the reporting parameter for the measurement report that a candidate cell queue meets a reporting rule for the measurement report.

According to a second aspect of embodiments of the present disclosure, a cell measurement method, applied to a UAV, includes: receiving a reporting parameter for a measurement report configured by a base station for cell measurement of the UAV, the reporting parameter for the measurement report at least including a specified measured cell number and a specified measurement time value; when one or more neighbor cells meeting a cell handover condition are detected, adding each of the one or more neighbor cells into a candidate cell queue; and when it is detected according to the reporting parameter for the measurement report that the candidate cell queue meets a reporting rule for the measurement report, sending the measurement report to the base station.

According to a third aspect of embodiments of the present disclosure, a base station includes: a processor; and a memory configured to store an instruction executable by the processor, wherein the processor is configured to: configure, for an unmanned aerial vehicle (UAV), a reporting parameter for a measurement report for cell measurement, the reporting parameter for the measurement report at least including a specified measured cell number and a specified measurement time value; and send the reporting parameter for the measurement report to the UAV, to enable the UAV to send the measurement report to the base station when it is detected according to the reporting parameter for the measurement report that a candidate cell queue meets a reporting rule for the measurement report.

According to a fourth aspect of embodiments of the present disclosure, a cell measurement apparatus, applied to a UAV, includes: a processor; and a memory configured to store an instruction executable by the processor, wherein the processor is configured to: receive a reporting parameter for a measurement report configured by a base station for cell measurement of the UAV, the reporting parameter for the measurement report at least including a specified measured cell number and a specified measurement time value; when one or more neighbor cells meeting a cell handover condition are detected, add each of the one or more neighbor cells into a candidate cell queue; and when it is detected according to the reporting parameter for the measurement report that the candidate cell queue meets a reporting rule for the measurement report, send the measurement report to the base station.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. For example, the terms "first," "second," "third," and the like are used to distinguish information of the same type, and do not limit the information. First information may also be referred to as second information and, similarly, second information may also be referred to as first information. The term "if" used here may be explained as "while" or "when" or "responsive to determining", which depends on the context.

Figure 1:
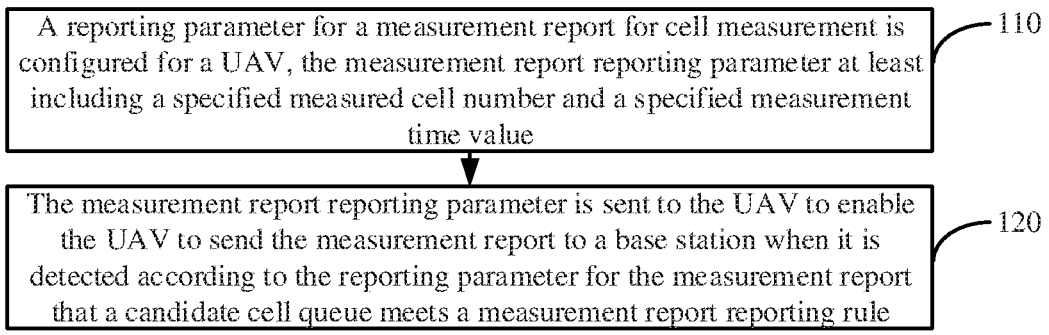
FIG. 1 is a flow chart showing a cell measurement method, according to an exemplary embodiment.
Figure 2:
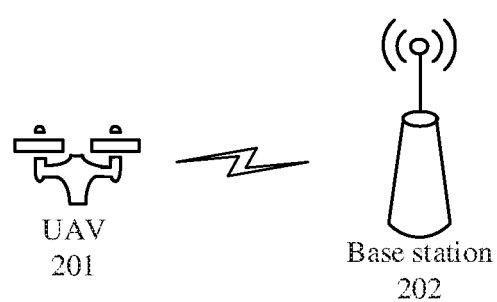
FIG. 2 is a scenario diagram of a cell measurement method, according to an exemplary embodiment.

FIG. 1 is a flow chart showing a cell measurement method, according to an exemplary embodiment. FIG. 2 is a scenario diagram of a cell measurement method, according to an exemplary embodiment. The cell measurement method can be applied to a base station, and the base station may configure, for an unmanned aerial vehicle (UAV), a reporting parameter for a measurement report for cell measurement. As illustrated in FIG. 1, the cell measurement method may include the following steps.

In step 101, a reporting parameter for a measurement report for cell measurement is configured for a UAV, the reporting parameter for the measurement report at least including a specified measured cell number and a specified measurement time value.

In embodiments of the present disclosure, the UAV is a cellular-network-based UAV, namely the UAV can use service provided by a cellular network.

When the base station configures a measurement parameter for the cellular-network-based UAV in a connected state, in addition to a conventional cell measurement parameter, the reporting parameter for the measurement report for cell measurement is also added. The reporting parameter for the measurement report can include one specified measured cell number and one specified measurement time value, and can also include multiple specified measured cell numbers and multiple specified measurement time values.

The specified measured cell number can be a numerical value greater than 1, for example, 2. The base station configures the specified measured cell number for limiting a measurement report reporting frequency of the UAV through the number of neighbor cells meeting a cell handover condition, for example, the UAV sends the measurement report to the base station only when the UAV detects that the number of the neighbor cells meeting the cell handover condition is more than or equal to the specified measured cell number. In such a manner, the circumstance that the UAV sends the measurement report to the base station when only one neighbor cell meeting the cell handover condition is detected can be avoided, so that the measurement report sending frequency of the UAV is reduced.

The specified measurement time value can be a time value greater than 0, for example, 3 seconds. The base station configures a measurement timer for limiting the measurement report reporting frequency of the UAV through the cell measurement time, for example, the UAV cannot send the measurement report to the base station when the UAV detects that the number of the neighbor cells meeting the cell handover condition is less than the specified measured cell number and the measurement timer configured to indicate the cell measurement time does not exceed the specified measurement time value, and the UAV sends the measurement report to the base station only when the measurement timer exceeds the specified measurement time value. In such a manner, the measurement report sending frequency of the UAV can also be reduced.

In step 120, the reporting parameter for the measurement report is sent to the UAV to enable the UAV to send a measurement report to the base station when it is detected according to the reporting parameter for the measurement report that a candidate cell queue meets/satisfies a measurement report reporting rule.

In embodiments of the present disclosure, the base station sends the reporting parameter for the measurement report to the UAV for a purpose of enabling the UAV to send the measurement report to the base station when it is detected according to the reporting parameter for the measurement report that the candidate cell queue meets the measurement report reporting rule.

Each parameter value in the reporting parameter for the measurement report configured by the base station is not fixed. Each parameter value can be regularly regulated, or each parameter value can be regulated in real time according to a practical condition, and then the regulated reporting parameter for the measurement report is sent to the UAV The base station can send the reporting parameter for the measurement report to the UAV in, but not limited to, the following sending manner: the reporting parameter for the measurement report is sent to the UAV through Radio Resource Control (RRC) signaling.

In art exemplary scenario, as illustrated in FIG. 2, a UAV 201 and a base station 202 are included. The base station 202 configures a reporting parameter for a measurement report for cell measurement for the UAV 201, the reporting parameter for the measurement report at least including a specified measured cell number and a specified measurement time value, and the base station 202 sends the reporting parameter for the measurement report to the UAV 201. The UAV 201, when receiving the reporting parameter for the measurement report sent from the base station 202, can send the measurement report to the base station 202 when it is detected according to the reporting parameter for the measurement report that a candidate cell queue meets a measurement report reporting rule.

It can be seen from the embodiment that the reporting parameter for the measurement report for cell measurement is configured for the UAV, the reporting parameter for the measurement report at least includes the specified measured cell number and the specified measurement time value, and the reporting parameter for the measurement report is sent to the UAV. Then the UAV cart conveniently send the measurement report to the base station only when it is detected according to the reporting parameter for the measurement report that the candidate cell queue meets the measurement report reporting rule, so that the circumstance that the UAV sends the measurement report to the base station when only one neighbor cell meeting the cell handover condition is detected is avoided, the measurement report sending frequency of the UAV is reduced, and a signaling overhead of the UAV is reduced.

In an embodiment, the reporting parameter for the measurement report configured by the base station for the UAV includes multiple sets of specified measured cell numbers and specified measurement time values, each set of specified measured cell number and specified measurement time value corresponding to a UAV height, so that the UAV can determine one set of specified measured cell number and specified measurement time value corresponding to a present height of the UAV according to the multiple sets of specified measured cell numbers and specified measurement time values.

In embodiments of the present disclosure, the UAV can be at different heights, and the set of specified measured cell number and specified measurement time value corresponding to a height can be different from those corresponding to other heights. For example, a greater specified measurement time value can be configured for a greater UAV height. In such case, even after flying higher, the UAV can detect more neighbor cells but not frequently send the measurement report, so that the signaling overhead of the UAV is reduced, and resource waste caused by frequent cell handover is further avoided.

In addition, the UAV height corresponding to the specified measured cell number and specified measurement time value configured by the base station may not be fixed, and the base station can determine a corresponding relationship therebetween according to a practical condition.

For example, as illustrated in Table 1, the reporting parameter for the measurement report includes three sets of specified measured cell numbers and specified measurement time values.

TABLE 1

| Reporting parameter for measurement report | | UAV height |
|---|---|---|
| Specified measured cell number 1 | Specified measurement time value 1 | First UAV height |
| Specified measured cell number 2 | Specified measurement time value 2 | Second UAV height |
| Specified measured cell number 3 | Specified measurement time value 3 | Third UAV height |

The first set includes the specified measured cell number 1 and the specified measurement time value 1, and corresponds to a first UAV height. The second set includes the specified measured cell number 2 and the specified measurement time value 2, and corresponds to a second UAV height. The third set includes the specified measured cell number 3 and the specified measurement time value 3, and corresponds to a third UAV height.

In the embodiment, the multiple sets of specified measured cell numbers and specified measurement time values are configured for the UAV, each set corresponding to a UAV height, to establish a corresponding relationship between a specified measured cell number, a specified measurement time value and a UAV height. In such a manner, the UAV can dynamically select the measured cell number and specified measurement time value corresponding to the present height according to a height change in a flight process, so that the circumstance that the measurement report reporting frequency changes along with the change of the UAV height is avoided, and stability of the measurement report reporting frequency is improved.

In an embodiment, the UAV height includes a UAV height level, and each UAV height level corresponds to a set of measured cell number and measurement timer, to facilitate configuration of the reporting parameter for the measurement report, and to improve configuration efficiency of the reporting parameter for the measurement report.

In an embodiment, each UAV height level corresponds to a UAV height interval, and different UAV height levels correspond to different UAV height intervals.

For example, as illustrated in Table 2, the UAV height can include a UAV height level and a UAV height interval.

TABLE 2

| Reporting parameter for measurement report | | UAV height | |
|---|---|---|---|
| Specified measured cell number | Specified measurement time value | UAV height level | UAV height interval |
| 3 | 3 seconds | Low height level | 0-50 meters |
| 4 | 3 seconds | Medium height level | 50-100 meters |
| 5 | 4 seconds | High height level | 100-200 meters |

In case of a low height level, the corresponding UAV height interval is 0-50 meters, and the corresponding measured cell number and measurement timer are 3 and 3 seconds respectively. In case of a medium height level, the corresponding UAV height interval is 50-100 meters, and the corresponding measured cell number and measurement timer are 4 and 3 seconds respectively. In case of a high height level, the corresponding UAV height interval is 100-200 meters, and the corresponding measured cell number and measurement timer are 5 and 4 seconds respectively.

In the embodiment, each UAV height level corresponds to a UAV height interval, and different UAV height levels correspond to different UAV height intervals, so that the UAV height interval is associated with the UAV height level, and efficiency of determining the reporting parameter for the measurement report corresponding to the present flight height by the UAV is improved.

Figure 3:
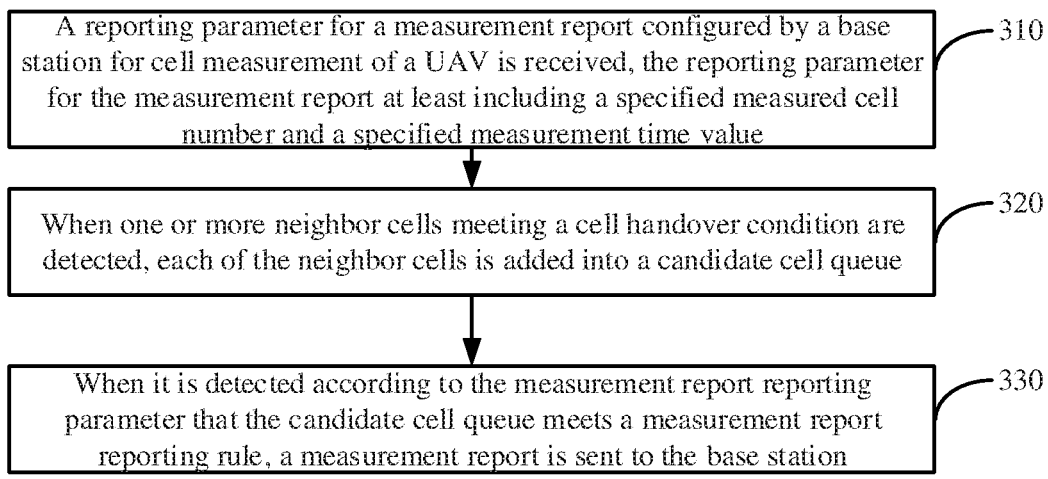
FIG. 3 is a flow chart showing a cell measurement method, according to an exemplary embodiment.

FIG. 3 is a flow chart showing a cell measurement method, according to an exemplary embodiment. The cell measurement method can be applied to a UAV. As illustrated in FIG. 3, the cell measurement method includes the following steps.

In step 310, a reporting parameter for a measurement report configured by a base station for cell measurement of the UAV is received, the reporting parameter for the measurement report at least including a specified measured cell number and a specified measurement time value.

In embodiments of the present disclosure, the reporting parameter for the measurement report received by the UAV can include one specified measured cell number and one specified measurement time value, and can also include multiple specified measured cell numbers and multiple specified measurement time values.

In step 320, when one or more neighbor cells meeting a cell handover condition are detected, each neighbor cell is added into a candidate cell queue.

In embodiments of the present disclosure, the UAV, when detecting a neighbor cell meeting the cell handover condition, does not directly send a measurement report but adds the neighbor cell into the candidate cell queue as a candidate cell.

In step 330, when it is detected according to the reporting parameter for the measurement report that the candidate cell queue meets a measurement report reporting rule, the measurement report is sent to the base station.

In embodiments of the present disclosure, the reporting parameter for the measurement report corresponds to the measurement report reporting rule, and the UAV may send the measurement report to the base station only when the candidate cell queue meets the measurement report reporting rule corresponding to the measurement report reporting parameter.

If the reporting parameter for the measurement report only includes one specified measured cell number and one specified measurement time value, the measurement report reporting rule corresponding to the specified measured cell number and the specified measurement time value can be directly adopted to detect the candidate cell queue.

If the reporting parameter for the measurement report includes multiple specified measured cell numbers and multiple specified measurement time values, i.e., multiple sets of specified measured cell numbers and specified measurement time values, one set of specified measured cell number and specified measurement time value can be selected therefrom, and the measurement report reporting rule corresponding to the selected specified measured cell number and specified measurement time value is adopted to detect the candidate cell queue.

In the embodiments, the reporting parameter for the measurement report configured by the base station for cell measurement of the UAV is received, the reporting parameter for the measurement report at least includes the specified measured cell number and the specified measurement time value, each neighbor cell is added into the candidate cell queue when one or more neighbor cells meeting the cell handover condition are detected, and the measurement report is sent to the base station when it is detected according to the reporting parameter for the measurement report that the candidate cell queue meets the measurement report reporting rule, so that the circumstance that the UAV sends the measurement report to the base station when only one neighbor cell meeting the cell handover condition is detected is avoided, a measurement report sending frequency of the UAV is reduced, and a signaling overhead of the UAV is reduced.

Figure 4:
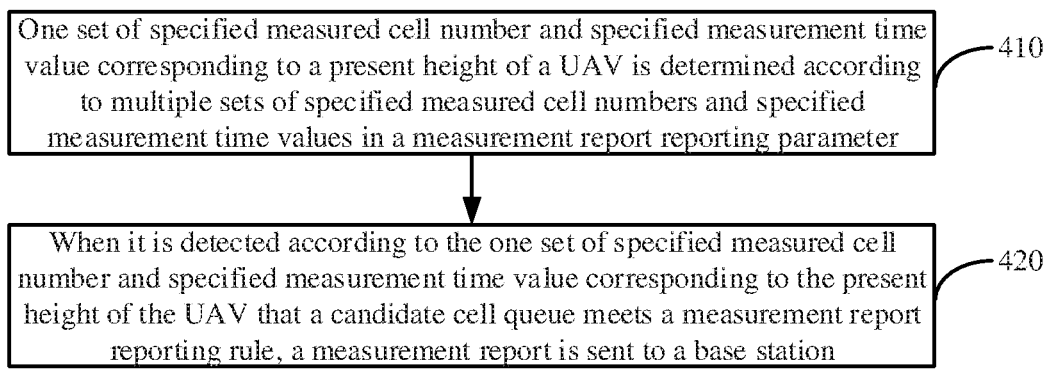
FIG. 4 is a flow chart showing a cell measurement method, according to an exemplary embodiment.

In an embodiment, as illustrated in FIG. 4, the reporting parameter for the measurement report in step 310 includes multiple sets of specified measured cell numbers and specified measurement time values, and each set of the multiple sets of specified measured cell numbers and specified measurement time values corresponds to a UAV height. When the UAV executes step 330, the following steps can be included.

In step 410, one set of specified measured cell number and specified measurement time value corresponding to a present height of the UAV is determined according to the multiple sets of specified measured cell numbers and specified measurement time values in the reporting parameter for the measurement report.

For example, if the present height of the UAV is 60 meters, it can be obtained from Table 2 that the present height of the UAV corresponds to the specified measured cell number 4 and the specified measurement time value 3 seconds.

In step 420, when it is detected according to the one set of specified measured cell number and specified measurement time value corresponding to the present height of the UAV that the candidate cell queue meets the measurement report reporting rule, the measurement report is sent to the base station.

In the embodiment, the one set of specified measured cell number and specified measurement time value corresponding to the present height of the UAV is determined according to the multiple sets of specified measured cell numbers and specified measurement time values in the measurement report reporting parameter. When it is detected according to the one set of specified measured cell number and specified measurement time value corresponding to the present height of the UAV that the candidate cell queue meets the measurement report reporting rule, the measurement report is sent to the base station. In such a manner, the UAV can dynamically select the measured cell number and specified measurement time value corresponding to the present height according to a height change in a flight process, so that the circumstance that the measurement report reporting frequency changes along with the change of the UAV height is avoided, and stability of the measurement report reporting frequency is improved.

In an embodiment, the measurement report reporting rule in the method illustrated in FIG. 3 or FIG. 4 can include, but not be limited to, the following conditions.

A first condition: a candidate cell number of the candidate cell queue is more than or equal to the specified measured cell number.

Under this condition, no matter whether a measurement timer configured to indicate cell measurement time exceeds the specified measurement time value or not, the UAV can send the measurement report to the base station when the candidate cell number of the candidate cell queue is more than or equal to the specified measured cell number.

A second condition: the candidate cell number of the candidate cell queue is less than the specified measured cell number and the measurement timer configured to indicate the cell measurement time exceeds the specified measurement time value.

Under this condition, the UAV not only judges whether the candidate cell number of the candidate cell queue is less than the specified measured cell number or not, but also judges whether the measurement timer configured to indicate the cell measurement time exceeds the specified measurement time value or not, and the UAV can send the measurement report to the base station only when the second condition is met.

In addition, when the candidate cell number of the candidate cell queue is less than the specified measured cell number and the measurement timer configured to indicate the cell measurement time does not exceed the specified measurement time value, the UAV may not send the measurement report to the base station, but may wait and send the measurement report when the first condition or the second condition is met.

In the embodiments, the UAV sends the measurement report to the base station only when the candidate cell number of the candidate cell queue is more than or equal to the specified measured cell number, or when the candidate cell number of the candidate cell queue is less than the specified measured cell number and the measurement timer configured to indicate the cell measurement time exceeds the specified measurement time value. In such a manner, the measurement report sending frequency may not be increased even though the UAV can detect more neighbor cells after flying higher, so that the signaling overhead of the UAV is reduced.

In an embodiment, the UAV, after sending the measurement report to the base station, can adopt, but not limited to, any one of the following two processing manners.

A first manner: the candidate cell queue is cleared, and the measurement timer configured to indicate the cell measurement time is reset and turned on.

A second manner: the candidate cell queue is cleared, the measurement timer configured to indicate the cell measurement time is reset, and when it is detected that a first candidate cell is added into the candidate cell queue, the measurement timer is turned on.

In the embodiment, the UAV, after sending the measurement report to the base station, may further clear the candidate cell queue, and reset and turn on the measurement timer configured to indicate the cell measurement time to prepare for subsequent cell measurement, so that cell measurement accuracy is improved.

Figure 5:
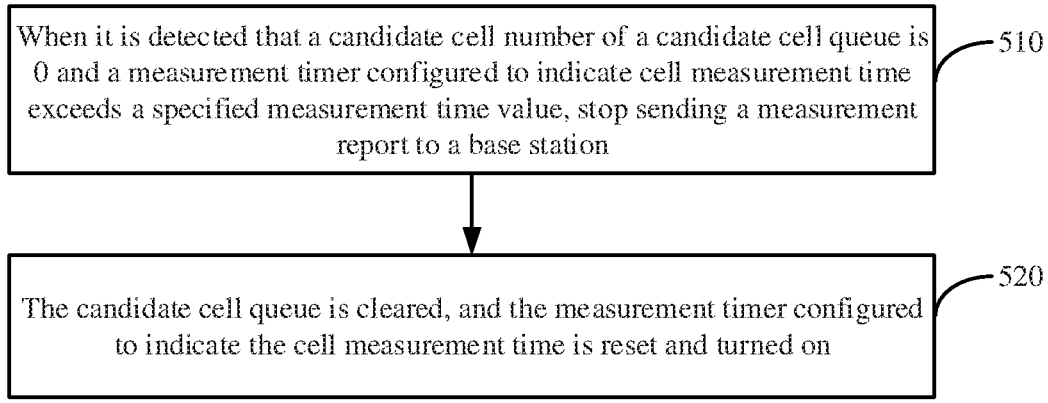
FIG. 5 is a flow chart showing a cell measurement method, according to an exemplary embodiment.

In an embodiment, as illustrated in FIG. 5, based on the method illustrated in FIG. 3 or FIG. 4, the cell measurement method further includes stopping sending the measurement report, including the following steps.

In step 510, when it is detected that the candidate cell number of the candidate cell queue is 0 and the measurement timer configured to indicate the cell measurement time exceeds the specified measurement time value, the measurement report is stopped to be sent to the base station.

In step 520, the candidate cell queue is cleared and the measurement timer configured to indicate the cell measurement time is reset and turned on. In some embodiments, the measurement timer is turned on when it is detected that the first candidate cell is added into the candidate cell queue.

In the embodiments, when it is detected that the candidate cell number of the candidate cell queue is 0 and the measurement timer configured to indicate the cell measurement time exceeds the specified measurement time value, the UAV can directly stop sending the measurement report to the base station, clear the candidate cell queue and reset and turn on the measurement timer configured to indicate the cell measurement time to prepare for subsequent cell measurement, so that resource waste during cell measurement is avoided, and the cell measurement accuracy is further improved.

Corresponding to the embodiments of the cell measurement method, the present disclosure also provides embodiments of a cell measurement apparatus.

Figure 6:
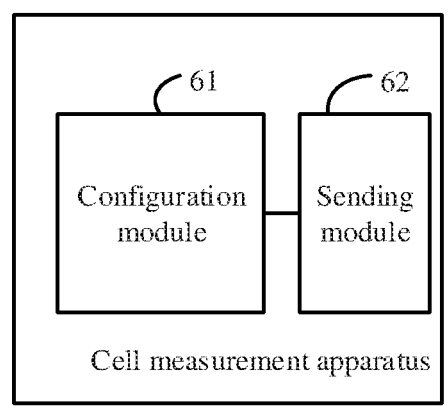
FIG. 6 is a block diagram of a cell measurement apparatus, according to an exemplary embodiment.

FIG. 6 is a block diagram of a cell measurement apparatus, according to an exemplary embodiment. The apparatus is applied to a base station, and the base station may configure, for a UAV, a reporting parameter for a measurement report for cell measurement. As illustrated in FIG. 6, the cell measurement apparatus can include: a configuration module 61 and a sending module 62.

The configuration module 61 is configured to configure, for a UAV a reporting parameter for the measurement report for cell measurement, and the reporting parameter for the measurement report at least includes a specified measured cell number and a specified measurement time value.

The sending module 62 is configured to send the reporting parameter for the measurement report to the UAV to enable the UAV to send the measurement report to the base station when it is detected according to the reporting parameter for the measurement report that a candidate cell queue meets a measurement report reporting rule.

In the embodiment, the reporting parameter for the measurement report for cell measurement is configured for the UAV, the reporting parameter for the measurement report at least includes the specified measured cell number and the specified measurement time value, and the reporting parameter for the measurement report is sent to the UAV. Then the UAV can conveniently send the measurement report to the base station only when it is detected according to the reporting parameter for the measurement report that the candidate cell queue meets the measurement report reporting rule, so that the circumstance that the UAV sends the measurement report to the base station when only one neighbor cell meeting the cell handover condition is detected is avoided, a measurement report sending frequency of the UAV is reduced, and a signaling overhead of the UAV is reduced.

In an embodiment, the reporting parameter for the measurement report configured by the configuration module 61 includes multiple sets of specified measured cell numbers and specified measurement time values, and each set of the multiple sets of specified measured cell numbers and specified measurement time values corresponds to a UAV height.

In the embodiment, the multiple sets of specified measured cell numbers and specified measurement time values are configured for the UAV, each set corresponding to a UAV height, to establish a corresponding relationship between a specified measured cell number, a specified measurement time value and a UAV height. In such a manner, the UAV can dynamically select the measured cell number and specified measurement time value corresponding to the present height according to a height change in a flight process, so that the circumstance that the measurement report reporting frequency changes along with the change of the UAV height is avoided, and stability of the measurement report reporting frequency is improved.

In an embodiment, the UAV height includes a UAV height level, and each UAV height level corresponds to a set of specified measured cell number and specified measurement time value, to facilitate configuration of the reporting parameter for the measurement report, and to improve configuration efficiency of the reporting parameter for the measurement report.

In an embodiment, each UAV height level corresponds to a UAV height interval, and different UAV height levels correspond to different UAV height intervals. Accordingly, the UAV height interval is associated with the UAV height level, and efficiency of determining the reporting parameter for the measurement report corresponding to the present flight height by the UAV is improved.

Figure 7:
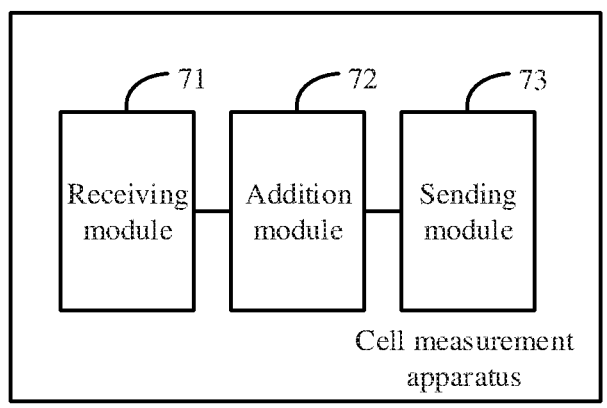
FIG. 7 is a block diagram of a cell measurement apparatus, according to an exemplary embodiment.

FIG. 7 is a block diagram of a cell measurement apparatus, according to an exemplary embodiment. The cell measurement apparatus can be applied to a UAV. As illustrated in FIG. 7, the cell measurement apparatus can include: a receiving module 71, an addition module 72, and a sending module 73.

The receiving module 71 is configured to receive a reporting parameter for the measurement report configured by a base station for cell measurement of the UAV, and the reporting parameter for the measurement report at least includes a specified measured cell number and a specified measurement time value;

The addition module 72 is configured to, when one or more neighbor cells meeting a cell handover condition are detected, add each neighbor cell into a candidate cell queue.

The sending module 73 is configured to, when it is detected according to the reporting parameter for the measurement report that the candidate cell queue meets a measurement report reporting rule, send a measurement report to the base station.

In the embodiment, the reporting parameter for the measurement report configured by the base station for cell measurement of the UAV is received, and the reporting parameter for the measurement report at least includes the specified measured cell number and the specified measurement time value. Each neighbor cell is added into the candidate cell queue when one or inure neighbor cells meeting the cell handover condition are detected, and the measurement report is sent to the base station when it is detected according to the reporting parameter for the measurement report that the candidate cell queue meets the measurement report reporting rule, so that the circumstance that the UAV sends the measurement report to the base station when only one neighbor cell meeting the cell handover condition is detected is avoided, a measurement report sending frequency of the UAV is reduced, and a signaling overhead of the UAV is reduced.

Figure 8:
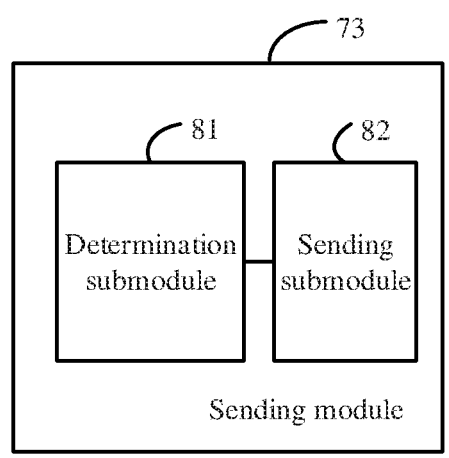
FIG. 8 is a block diagram of another cell measurement apparatus, according to an exemplary embodiment.

FIG. 8 is a block diagram of a cell measurement apparatus, according to an exemplary embodiment. The apparatus is applied to a UAV, and is based on the apparatus illustrated in FIG. 7. In the embodiment, the reporting parameter for the measurement report includes multiple sets of specified measured cell numbers and specified measurement time values, and each set of the multiple sets of specified measured cell numbers and specified measurement time values corresponds to a UAV height.

As illustrated in FIG. 8, the sending module 73 can include: a determination submodule 81, configured to determine one set of specified measured cell number and specified measurement time value corresponding to a present height of the UAV according to the multiple sets of specified measured cell numbers and specified measurement time values in the measurement report reporting parameter; and a sending submodule 82, configured to, when it is detected according to the one set of specified measured cell number and specified measurement time value corresponding to the present height of the UAV that the candidate cell queue meets the measurement report reporting rule, send the measurement report to the base station.

In the embodiment, one set of specified measured cell number and specified measurement time value corresponding to the present height of the UAV is determined according to the multiple sets of specified measured cell numbers and specified measurement time values in the measurement report reporting parameter. When it is detected according to the one set of specified measured cell number and specified measurement time value corresponding to the present height of the UAV that the candidate cell queue meets the measurement report reporting rule, the measurement report is sent to the base station. In such a manner, the UAV can dynamically select the measured cell number and specified measurement time value corresponding to the present height according to a height change in a flight process, so that the circumstance that the measurement report reporting frequency changes along with the change of the UAV height is avoided, and stability of the measurement report reporting frequency is improved.

In an embodiment, the measurement report reporting rule includes that: a candidate cell number of the candidate cell queue is more than or equal to the specified measured cell number, or that the candidate cell number of the candidate cell queue is less than the specified measured cell number and a measurement timer configured to indicate cell measurement time exceeds the specified measurement time value; and the measurement report includes cell information corresponding to each candidate cell in the candidate cell queue.

In the embodiment, the UAV sends the measurement report to the base station only when the candidate cell number of the candidate cell queue is more than or equal to the specified measured cell number or when the candidate cell number of the candidate cell queue is less than the specified measured cell number and the measurement timer configured to indicate the cell measurement time exceeds the specified measurement time value. In such a manner, the measurement report sending frequency cannot be increased even though the UAV can detect more neighbor cells after flying higher, so that the signaling overhead of the UAV is reduced.

Figure 9:
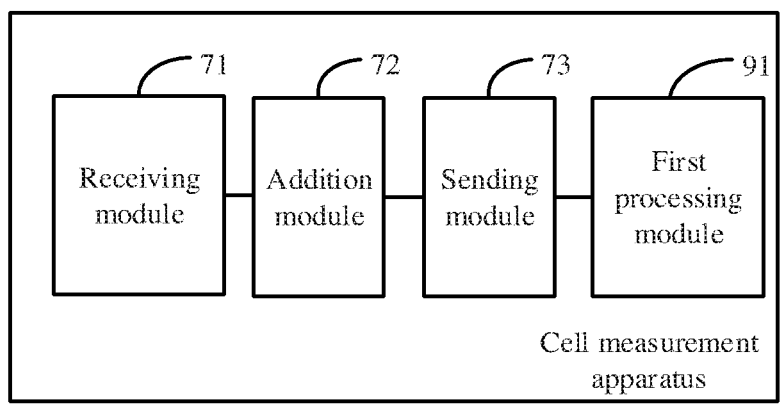
FIG. 9 is a block diagram of another cell measurement apparatus, according to an exemplary embodiment.

FIG. 9 is a block diagram of a cell measurement apparatus, according to an exemplary embodiment. The cell measurement apparatus can be applied to a UAV, and is based on the cell measurement apparatus illustrated in FIG. 7 or FIG. 8. As illustrated in FIG. 9, the cell measurement apparatus can further include: a first processing module 91, configured to clear the candidate cell queue and reset and turn on the measurement timer. In some embodiments, when it is detected that a first candidate cell is added into the candidate cell queue, the measurement timer is turned on.

In the embodiments, the UAV, after sending the measurement report to the base station, may clear the candidate cell queue and reset and turn on the measurement timer configured to indicate the cell measurement time to prepare for subsequent cell measurement, so that cell measurement accuracy is improved.

Figure 10:
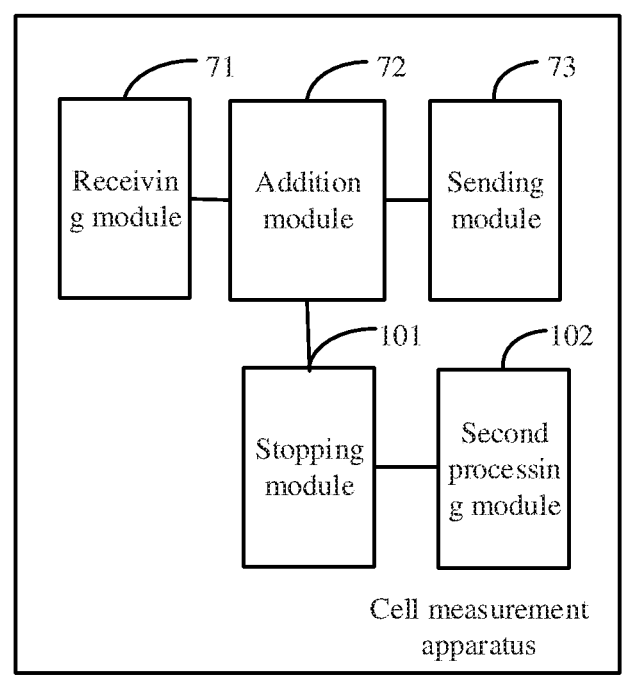
FIG. 10 is a block diagram of another cell measurement apparatus, according to an exemplary embodiment.

FIG. 10 is a block diagram of a cell measurement apparatus, according to an exemplary embodiment. The cell measurement apparatus can be applied to a UAV, and is based on the cell measurement apparatus illustrated in FIG. 7 or FIG. 8. As illustrated in FIG. 10, the cell measurement apparatus can further include: a stopping module 101 and a second processing module 102.

The stopping module 101 is configured to, when it is detected that the candidate cell number of the candidate cell queue is 0 and the measurement timer configured to indicate the cell measurement time exceeds the specified measurement time value, stop sending the measurement report to the base station.

The second processing module 102 is configured to clear the candidate cell queue and reset and turn on the measurement timer; or, clear the candidate cell queue, reset the measurement timer, and when it is detected that the first candidate cell is added into the candidate cell queue, turn on the measurement timer.

In the embodiment, when it is detected that the candidate cell number of the candidate cell queue is 0 and the measurement timer configured to indicate the cell measurement time exceeds the specified measurement time value, the UAV can directly stop sending the measurement report to the base station, clear the candidate cell queue and reset and turn on the measurement timer configured to indicate the cell measurement time to prepare for subsequent cell measurement, so that resource waste during cell measurement is avoided, and the cell measurement accuracy is further improved.

The present disclosure also provides a non-transitory computer-readable storage medium having stored therein a computer program that, when executed by a processor of a device, cause the device to perform any of the above described cell measurement methods.

The present disclosure also provides a base station including: a processor; and a memory configured to store art instruction executable for the processor, wherein the processor is configured to: configure, for a UAV, a reporting parameter for a measurement report for cell measurement, the reporting parameter for the measurement report at least including a specified measured cell number and a specified measurement time value; and send the reporting parameter for the measurement report to the UAV to enable the UAV to send a measurement report to the base station when it is detected according to the reporting parameter for the measurement report that a candidate cell queue meets a measurement report reporting rule.

Figure 11:
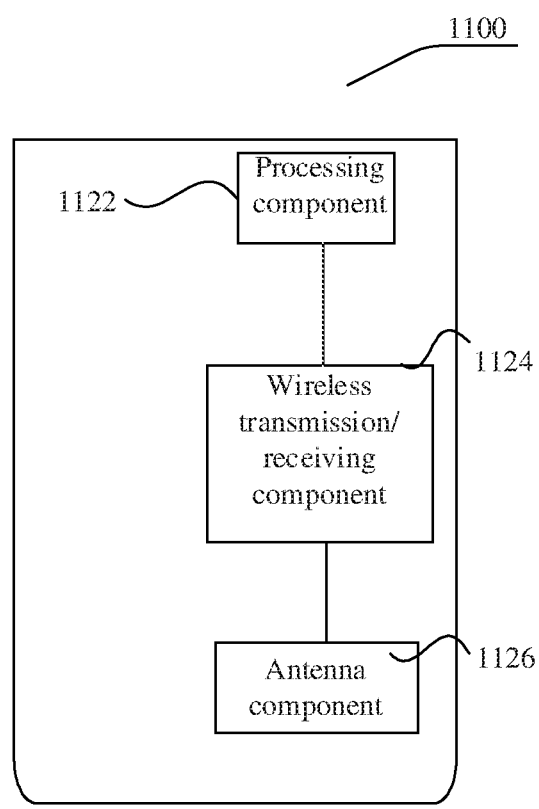
FIG. 11 is a schematic diagram of a cell measurement apparatus, according to an exemplary embodiment.

FIG. 11 is a schematic diagram of a cell measurement apparatus 1100, according to an exemplary embodiment. The apparatus 1100 can be provided as a base station or a UAV. Referring to FIG. 11, the apparatus 1100 includes a processing component 1122, a wireless transmission/receiving component 1124, an antenna component 1126 and a wireless interface-specific signal processing part. The processing component 1122 can further include one or more processors.

One processor in the processing component 1122 can be configured to execute any of the above described cell measurement methods.

The present disclosure also provides a cell measurement apparatus, which is applied to a UAV and includes: a processor; and a memory configured to store an instruction executable for the processor, wherein the processor is configured to: receive a reporting parameter for a measurement report configured by a base station for cell measurement of the UAV, the reporting parameter for the measurement report at least including a specified measured cell number and a specified measurement time value; when one or more neighbor cells meeting a cell handover condition are detected, add each of the neighbor cells into a candidate cell queue; and when it is detected according to the reporting parameter for the measurement report that the candidate cell queue meets a measurement report reporting rule, send the measurement report to the base station.

Other implementation solutions of the present disclosure will be apparent to those skilled in the art front consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A cell measurement method, applied to a base station, comprising:
   configuring, for an unmanned aerial vehicle (UAV), a reporting parameter for a measurement report for cell measurement; and
   sending the reporting parameter for the measurement report to the UAV, to enable the UAV to send the measurement report to the base station when it is detected according to the reporting parameter for the measurement report that a candidate cell queue meets a reporting rule for the measurement report,
   wherein the reporting parameter for the measurement report comprises multiple sets of specified measured cell numbers and specified measurement time values, and each set of the multiple sets of specified measured cell numbers and specified measurement time values corresponds to a UAV height.

2. The method of claim 1, wherein the UAV height comprises one or more UAV height levels, and each of the one or more UAV height levels corresponds to one set of specified measured cell number and specified measurement time value.

3. The method of claim 2, wherein each of the one or more UAV height levels corresponds to a UAV height interval, and different UAV height levels correspond to different UAV height intervals.

4. A cell measurement method, applied to an unmanned aerial vehicle (UAV), comprising:
   receiving a reporting parameter for a measurement report configured by a base station for cell measurement of the UAV;
   when one or more neighbor cells meeting a cell handover condition are detected, adding each of the one or more neighbor cells into a candidate cell queue; and
   when it is detected according to the reporting parameter for the measurement report that the candidate cell queue meets a reporting rule for the measurement report, sending the measurement report to the base station,
   wherein the reporting parameter for the measurement report comprises multiple sets of specified measured cell numbers and specified measurement time values, and each set of the multiple sets of specified measured cell numbers and specified measurement time values corresponds to a UAV height.

5. The method of claim 4,
   wherein the sending the measurement report to the base station when it is detected according to the reporting parameter for the measurement report that the candidate cell queue meets the reporting rule for the measurement report comprises:
   determining one set of specified measured cell number and specified measurement time value corresponding to a present height of the UAV according to the multiple sets of specified measured cell numbers and specified measurement time values in the reporting parameter for the measurement report; and
   when it is detected according to the one set of specified measured cell number and specified measurement time value corresponding to the present height of the UAV that the candidate cell queue meets the reporting rule for the measurement report, sending the measurement report to the base station.

6. The method of claim 4, wherein the reporting rule for the measurement report comprises one of: a candidate cell number of the candidate cell queue being more than or equal to a specified measured cell number, or the candidate cell number of the candidate cell queue being less than the specified measured cell number and a measurement timer configured to indicate cell measurement time exceeding a specified measurement time value; and
   wherein the measurement report comprises cell information corresponding to each candidate cell in the candidate cell queue.

7. The method of claim 6, further comprising:
   clearing the candidate cell queue, and resetting and turning on the measurement timer.

8. The method of claim 4, further comprising:
   when it is detected that a candidate cell number of the candidate cell queue is 0 and a measurement timer configured to indicate cell measurement time exceeds a specified measurement time value, stopping sending the measurement report to the base station; and
   clearing the candidate cell queue, and resetting and turning on the measurement timer.

9. The method of claim 8, further comprising:
   when it is detected that a first candidate cell is added into the candidate cell queue, turning on the measurement timer.

10. A base station, comprising:
    a processor; and
    a memory configured to store an instruction executable by the processor, wherein the processor is configured to:
configure, for an unmanned aerial vehicle (UAV), a reporting parameter for a measurement report for cell measurement; and
send the reporting parameter for the measurement report to the UAV, to enable the UAV to send the measurement report to the base station when it is detected according to the reporting parameter for the measurement report that a candidate cell queue meets a reporting rule for the measurement report,
wherein the reporting parameter for the measurement report comprises multiple sets of specified measured cell numbers and specified measurement time values, and each set of the multiple sets of specified measured cell numbers and specified measurement time values corresponds to a UAV height.

11. The base station of claim 10, wherein the UAV height comprises one or more UAV height levels, and each of the one or more UAV height levels corresponds to one set of specified measured cell number and specified measurement time value.

12. The base station of claim 11, wherein each of the one or more UAV height levels corresponds to a UAV height interval, and different UAV height levels correspond to different UAV height intervals.

13. A cell measurement apparatus, applied to an unmanned aerial vehicle (UAV), comprising:
a processor; and
a memory configured to store an instruction executable for the processor,
wherein the processor is configured to:
receive a reporting parameter for a measurement report configured by a base station for cell measurement of the UAV;
when one or more neighbor cells meeting a cell handover condition are detected, add each of the one or more neighbor cells into a candidate cell queue; and
when it is detected according to the reporting parameter for the measurement report that the candidate cell queue meets a reporting rule for the measurement report, send the measurement report to the base station,
wherein the reporting parameter for the measurement report comprises multiple sets of specified measured cell numbers and specified measurement time values, and each set of the multiple sets of specified measured cell numbers and specified measurement time values corresponds to a UAV height.

14. The apparatus of claim 13, wherein the processor is further configured to:
determine one set of specified measured cell number and specified measurement time value corresponding to a present height of the UAV according to the multiple sets of specified measured cell numbers and specified measurement time values in the measurement report reporting parameter; and
send, when it is detected according to the one set of specified measured cell number and specified measurement time value corresponding to the present height of the UAV that the candidate cell queue meets the reporting rule for the measurement report, the measurement report to the base station.

15. The apparatus of claim 13, wherein the reporting rule for the measurement report comprises one of: a candidate cell number of the candidate cell queue being more than or equal to a specified measured cell number, or the candidate cell number of the candidate cell queue being less than the specified measured cell number and a measurement timer configured to indicate cell measurement time exceeding a specified measurement time value; and
wherein the measurement report comprises cell information corresponding to each candidate cell in the candidate cell queue.

16. The apparatus of claim 15, wherein the processor is further configured to:
clear the candidate cell queue, and reset and turn on the measurement timer.

17. The apparatus of claim 13, wherein the processor is further configured to:
when it is detected that the candidate cell number of the candidate cell queue is 0 and a measurement timer configured to indicate cell measurement time exceeds a specified measurement time value, stop sending the measurement report to the base station; and
clear the candidate cell queue, and reset and turn on the measurement timer.

18. The apparatus of claim 17, wherein the processor is further configured to:
when it is detected that a first candidate cell is added into the candidate cell queue, turn on the measurement timer.

* * * * *